United States Patent
Bartminn

(10) Patent No.: US 12,173,465 B2
(45) Date of Patent: Dec. 24, 2024

(54) METHOD FOR FORMING A CONNECTION BETWEEN TWO PIPE SEGMENTS OF DIFFERENT WIDTHS AND A CORRESPONDINGLY PRODUCED CONNECTION

(71) Applicant: RWE Renewables GmbH, Essen (DE)

(72) Inventor: Daniel Bartminn, Elmshorn (DE)

(73) Assignee: RWE Renewables GmbH, Essen (DE)

( * ) Notice: Subject to any disclaimer, the term of this patent is extended or adjusted under 35 U.S.C. 154(b) by 512 days.

(21) Appl. No.: 17/426,847

(22) PCT Filed: Jan. 7, 2020

(86) PCT No.: PCT/EP2020/050177
§ 371 (c)(1),
(2) Date: Jul. 29, 2021

(87) PCT Pub. No.: WO2020/160857
PCT Pub. Date: Aug. 13, 2020

(65) Prior Publication Data
US 2022/0106757 A1   Apr. 7, 2022

(30) Foreign Application Priority Data
Feb. 7, 2019   (DE) .................. 10 2019 103 070.6

(51) Int. Cl.
*E02D 5/52* (2006.01)
*E02B 17/00* (2006.01)
(Continued)

(52) U.S. Cl.
CPC .......... *E02D 5/526* (2013.01); *E02B 17/0008* (2013.01); *E02D 27/425* (2013.01);
(Continued)

(58) Field of Classification Search
CPC ... E02D 5/526; E02D 27/425; E02D 2600/20; F03D 13/25; E02B 17/0008;
(Continued)

(56) References Cited

U.S. PATENT DOCUMENTS

| 438,082 | A | * | 10/1890 | Milliken | ................. | E04H 12/08 |
| | | | | | | 52/651.07 |
| 1,475,090 | A | * | 11/1923 | Herron | ................... | F16L 21/035 |
| | | | | | | 138/120 |
| 1,781,682 | A | * | 11/1930 | Crotty | ................... | F16L 13/122 |
| | | | | | | 285/334.4 |

(Continued)

FOREIGN PATENT DOCUMENTS

| EP | 2698476 A1 | 2/2014 |
| EP | 2910682 B1 | 1/2018 |
| WO | 2018070868 A1 | 4/2018 |

*Primary Examiner* — Gisele D Ford
(74) *Attorney, Agent, or Firm* — The Webb Law Firm

(57) ABSTRACT

The invention relates to a method for forming a connection between two pipe segments of different widths, preferably of a tower-like structure, in particular of a wind turbine. In order to be able to connect pipe segments of different widths more easily, reliably and cost-effectively to one another, it is provided that the wider pipe segment is pushed with one end partially over an end of the narrower pipe segment, that the pipe segments are positioned apart from one another by forming an annular gap between the pipe segments, that in the annular gap between the two pipe segments a separating layer extending in the longitudinal direction of the pipe segments and/or in the radial direction is provided, that the annular gap adjacent to the separating layer and at least one side of the separating layer is at least partially cast with a casting compound, that during the hardening of the casting compound the casting compound forms a firm connection on one side of the separating layer with only one of the pipe segments and/or the casting compound forms a firm connection on the other side of the casting compound, only with the other pipe segment and that the pipe segments after the (Continued)

hardening of the casting compound are separated again along the separating layer with the assigned separate connecting elements in particular formed by the hardened casting compound.

16 Claims, 7 Drawing Sheets

(51) Int. Cl.
    *E02D 27/42*     (2006.01)
    *E04H 12/08*     (2006.01)
    *E04H 12/12*     (2006.01)
    *E04H 12/34*     (2006.01)
    *F03D 13/25*     (2016.01)

(52) U.S. Cl.
    CPC ............ *E04H 12/08* (2013.01); *E04H 12/12* (2013.01); *E04H 12/342* (2013.01); *F03D 13/25* (2016.05); *E02B 2017/0065* (2013.01); *E02B 2017/0091* (2013.01); *E02D 2600/20* (2013.01); *F05B 2240/912* (2013.01); *F05B 2240/95* (2013.01)

(58) Field of Classification Search
    CPC ..... E02B 2017/0065; E02B 2017/0091; E04H 12/08; E04H 12/12; E04H 12/342; F05B 2240/912; F05B 2240/95
    See application file for complete search history.

(56) References Cited

U.S. PATENT DOCUMENTS

| | | | |
|---|---|---|---|
| 2,036,771 A * | 4/1936 | Pfistershammer | E04H 12/08 52/298 |
| 3,034,209 A * | 5/1962 | Guiseppe | E04H 12/08 29/521 |
| 3,936,206 A * | 2/1976 | Meisberger | E04H 12/08 403/334 |
| 5,784,851 A * | 7/1998 | Waugh | E04H 12/08 405/249 |
| 2004/0094903 A1* | 5/2004 | Sutherland | F16L 21/035 277/609 |
| 2006/0185279 A1* | 8/2006 | Eusterbarkey | E02D 27/42 52/292 |
| 2010/0139181 A1* | 6/2010 | Cortina-Cordero | E04H 12/16 52/223.4 |
| 2014/0157715 A1* | 6/2014 | Wagner | E04G 11/20 52/651.07 |
| 2020/0040541 A1 | 2/2020 | Van Der Tempel | |

\* cited by examiner

METHOD FOR FORMING A CONNECTION BETWEEN TWO PIPE SEGMENTS OF DIFFERENT WIDTHS AND A CORRESPONDINGLY PRODUCED CONNECTION

CROSS-REFERENCE TO RELATED APPLICATIONS

This application is the U.S. national phase of International Application No. PCT/EP2020/050177 filed Jan. 7, 2020, and claims priority to German Patent Application No. 10 2019 103 070.6 filed Feb. 7, 2019, the disclosures of which are hereby incorporated by reference in their entirety.

BACKGROUND OF THE INVENTION

Field of the Invention

The invention relates to a method for forming a connection between two pipe segments of different widths, preferably of a tower-like structure, in particular of a wind turbine. Furthermore, the invention relates to the connection of two pipe segments of different widths, preferably of a tower-like structure, in particular of a wind turbine, with an annular gap between overlapping ends of a wider, outer pipe segment and a narrower, inner pipe segment.

Description of Related Art

Different methods are known by which two pipe segments of different widths can be connected to one another. According to the present understanding, the width of the pipe segments is so different that corresponding ends of the pipe segments can be inserted into each other at least in sections. Plug connections are known for the connection of such pipe segments, for example. These plug connections are joined in such a way that a pipe segment with an end is attached to an end of the other pipe segment. If the corresponding pipe ends are formed conically and correspondingly to one another, a force-fitting and form-fitting connection results in this way. If necessary, a sealant can be applied between the ends of the pipe segments. Alternatively, the overlapping ends of the pipe segments can be welded together or connected to one another by means of bolts. However, these connections are relatively complex and expensive to manufacture, in particular for large diameter pipe segments, which are regularly used for tower-like structures. For connections that are based on bolting, welding or frictional engagement of steel on steel, even minor deviations of the pipe segments from the assumed ideal geometry can significantly weaken the connection, which is why the connection can be difficult to calculate precisely.

Grout connections are also used in particular for the construction of wind turbines, especially offshore wind turbines, as they can be provided very easily, quickly and cost-effectively. The maintenance requirements for connections of this type are also manageable. For the production of grout connections, the corresponding ends of the pipe segments of different widths are inserted into one another so that an annular gap forms between the pipe segments, which is then cast with a casting compound, in particular a grout. After the grout has hardened, the two pipe ends are firmly connected to each other. However, casting the annular gap with the casting compound must take place on site, which is comparatively complicated. In addition, defective connections may occur during on-site grouting, which are difficult to detect afterwards and can also no longer be reworked. On the other hand, the requirements for dimensional accuracy are not as high as with bolted, welded or frictional connections.

In order to counteract the above-mentioned disadvantages, it has been proposed to equip cylindrical pipe segments with two mutually spaced and circumferential metal rings, the corresponding inner sides of which are conically milled off so that the corresponding conical inner sides of the metal rings lie in a form-fitting manner with one another when the pipe segments are inserted into one another in the longitudinal direction of the pipe segments. This is described, for example, in EP 2 910 682 A2. However, the provision of the rings is still quite complex and therefore expensive, especially since only very small tolerances can be accepted in the production of the conical inner surfaces.

SUMMARY OF THE INVENTION

Therefore, the object of the present invention is to design and further develop the method and the connection in each case of the type mentioned and explained in more detail at the outset such that pipe segments of different widths can be connected to one another more easily, reliably and cost-effectively.

This object is achieved by a method for forming a connection between two pipe segments of different widths, preferably of a tower-like structure, in particular of a wind turbine,
in which the wider pipe segment is pushed with one end partially over an end of the narrower pipe segment,
in which the pipe segments are positioned at a distance from one another, forming an annular gap between the pipe segments,
in which a separating layer extending in the longitudinal direction of the pipe segments and/or in the radial direction is provided in the annular gap between the two pipe segments,
in which the annular gap is cast at least partially with a casting compound adjacent to the separating layer and to at least one side of the separating layer,
in which, when the casting compound hardens, the casting compound forms a firm connection on one side of the separating layer with only one of the pipe segments and/or the casting compound on the other side of the casting compound only with the other pipe segment, and
in which the pipe segments after the hardening of the casting compound are separated again along the separating layer with the associated separate connecting elements, in particular formed by the hardened casting compound.

Said object is further achieved by a connection in that a connecting element is firmly connected to the outer circumferential side of the inner pipe segment in the annular gap, and in that a different connecting element is firmly connected to the inner circumferential side of the outer pipe segment in the annular gap, in that at least one of the connecting elements is formed by a hardened casting compound and in that at least the two connecting elements connect the pipe segments in an form-fitting and/or force-fitting manner in a longitudinal direction of the pipe segments.

The invention has therefore recognised that the connection can be prefabricated very effectively and reliably by casting the annular gap between the pipe segments with at least one casting compound, which is provided on one side of the separating layer. The connecting elements are separated by means of the at least one separating layer. However, it is particularly expedient for the annular gap to be cast on both sides of the separating layer by a casting compound. The casting compound is then divided by at least one separating layer into at least two separate regions, so that each part of the casting compound forms a different connecting element during hardening in the annular gap, wherein the connecting elements can subsequently be separated along the separating layer. If only one connecting element is formed from a casting compound, this connecting element is separated from a different, further connecting element by the separating layer.

The prefabricated connection can then be easily joined on site, namely by simply inserting the two pipe segments back into one another at the installation site. The connecting elements then form a form-fitting and/or force-fitting connection in a longitudinal direction of the pipe segments. The two connecting elements are firmly connected to the respective associated pipe segment by the previous, at least partial, casting of the annular gap. The pipe segments are therefore permanently connected to the connecting elements. Even if the connecting elements and the pipe segments are formed from different materials, the connecting elements and the pipe segments are preferably at least substantially bonded together or firmly glued to one another.

To prefabricate the connection, the two pipe segments are inserted one above the other with the ends assigned to each other in such a way that an annular gap forms between the pipe segments. At least one separating layer is provided in this annular gap, which extends in the longitudinal direction and/or in the radial direction and thus divides the annular gap into at least two different sections on different sides of the at least one separating layer. Of these two different regions, at least one region is then at least partially filled with a casting compound. Preferably, however, the at least two different regions are each filled with a casting compound, which then hardens in the annular gap. In this case, the casting compound forms at least one separate connecting element or preferably at least two separate connecting elements. The connecting elements on both sides of the separating layer are separated from one another by the separating layer, but are each firmly connected to the respectively assigned pipe segment. As a result of the separating layer, the pipe segments can be pulled out again against one another after the hardening of the at least one casting compound, wherein the at least two connecting elements can then be separated from one another again along the at least one separating layer. Later, the corresponding pipe segments can then be reinserted into one another in order to create an form-fitting and/or force-fitting connection.

In principle, a plurality of separating layers can be provided in the annular gap, which then, if required, lead to more than two separate regions for hardening the casting compound and/or to more than two different connecting elements. However, as the connection and its manufacture are to be made as simple and cost-effective as possible, this probably only occurs in very special cases. In contrast, it will be particularly preferable for the at least one separating layer to be provided circumferentially in the annular gap. This simplifies the method and enables the formation of at least one at least substantially uniformly circumferential connecting element in a simple manner.

Casting compounds that form during hardening a sufficiently strong connection with the corresponding pipe segments taking into account the material of the ring segments are known to the person skilled in the art or can be determined by the person skilled in the art by simple tests.

In addition, the advantages of the connection described are particularly relevant for tower-like structures, especially for wind turbines, especially for offshore wind turbines. In such structures, pipe segments with a large diameter are used and the corresponding connections must be cost-effective and also be able to reliably absorb high loads.

For ease of understanding and to avoid unnecessary repetition, the method and the connection are described together in the following, without always distinguishing in each case in detail between the method and the connection. For the person skilled in the art, however, the context determines which features are particularly preferable in relation to the method and the connection.

In the case of a first particularly preferable embodiment of the method, the separated pipe segments are reconnected after separation of the pipe segments along the separating layer such that at least the separate connecting elements formed from the already hardened casting compound form a form-fitting and/or force-fitting connection in the longitudinal direction of the pipe segments. If only one connecting element is formed by a hardened casting compound, the connecting elements nevertheless form a form-fitting and/or force-fitting connection in the longitudinal direction of the pipe segments. This can simply be done at the installation site of the tower-like structure in order to join the two pipe segments in a conclusive and defined manner. In this case, it is particularly preferred if the same pipe segments that have been inserted into one another to form the annular gap and to harden the at least one casting compound therein are inserted into one another again. It is further expedient for the pipe segments to be rotated about the longitudinal axis in the same way as when the at least one casting compound is hardened. This ensures that the corresponding connecting elements are also designed to correspond to one another to the greatest possible extent.

It is particularly expedient for the construction of a tower-like structure and also for the provision of a corresponding connection if steel pipe segments or reinforced concrete pipe segments in particular are used as pipe segments. This means that high towers can be manufactured and high loads can be reliably absorbed in the connection. In order to simplify the connection and production of the tower-like structure, it is also advisable to use cylindrical or conical pipe segments as pipe segments at least in the region of the annular gap. This also saves costs compared to more complex structures. The connection also has special advantages for the aforementioned reasons, if pipe segments of an offshore structure are used as pipe segments and/or if tower segments of a wind turbine, in particular of an offshore wind turbine, are used as pipe segments.

Alternatively or additionally, the method and the connection are simplified if the pipe segments are positioned concentrically to one another with the formation of an annular gap between the pipe segments. This also promotes the equal absorption and dissipation of forces from the tower-like structure as required.

In order to be able to separate the pipe segments from one another easily after the hardening of the at least one casting compound and to avoid excessive adhesion to one another and/or to a further connecting element, it is advisable to use a film, preferably a plastic film, in particular a film made of polyvinyl chloride (PVC) and/or polytetrafluoroethylene (PTFE) as a separating layer.

The arrangement of the separating layer in the annular gap is particularly easy and quick to ensure if at least one region of the separating layer is arranged cylindrically within it at least in sections. In this case, the at least one casting compound can also be introduced very easily and quickly into the at least one remaining free space on one side of the separating layer or preferably on the opposite sides of the separating layer. This applies in particular if at least the cylindrical section of the separating layer extends at least substantially concentrically to the inner pipe segment and/or to the outer pipe segment. The connecting elements created in this way then form no or only a slight form-fitting connection. If, however, expansive casting compounds are used, i.e. casting compounds that still expand after hardening, a force-fitting connection can be obtained in the longitudinal direction of the pipe segments, which can absorb high forces.

Alternatively or additionally, the separating layer in the annular gap can be provided such that the separating layer or region of the separating layer provided in the annular gap between the two pipe segments at least substantially closes the annular gap in the longitudinal direction of the pipe segments. In this case, the at least one casting compound can also be introduced particularly easily and quickly into the at least one free space on one side of the separating layer or preferably the remaining free spaces on the opposite sides of the separating layer.

Alternatively or additionally to an at least regional cylindrical arrangement of the separating layer, the separating layer can also be formed conically and/or obliquely in the radial direction to the longitudinal direction of the pipe segments at least in sections. In this way, conical or respectively shaped connecting elements can be simply created which lead to a pronounced form-fitting connection between the pipe segments in a longitudinal direction of the pipe segments. This applies in particular if the separating layer is provided at least in the conical section on the inner edge of the annular gap in the longitudinal direction of the pipe segments closer to the end of the inner pipe segment assigned to the annular gap than to the outer edge of the annular gap and/or on the outer edge of the annular gap in the longitudinal direction of the pipe segments closer to the end of the outer pipe segment assigned to the annular gap than to the inner edge of the annular gap. In this manner, it is possible to ensure that the at least one connecting element of an upper and outer pipe segment inwardly overlaps the at least one connecting element of the lower and inner pipe segment in a form-fitting manner. Alternatively, it is possible to ensure that the at least one connecting element of an upper and inner pipe segment inwardly overlaps the at least one connecting element of the lower and outer pipe segment in a form-fitting manner.

In order to ensure a high force-fitting connection of the connection between the pipe segments, the annular gap can be at least partially cast with casting compound if the outer pipe segment is heated and/or if the inner pipe segment is cooled and/or after hardening of the casting compound they can be reinserted into each other if the outer pipe segment is heated and/or the inner pipe segment is cooled. As a result of the thermal longitudinal expansion, the connecting elements of the pipe segments are pressed against each other in the connected state.

In order for the pipe segments to be separated from one another more easily after the hardening of the at least one casting compound, the annular gap can be separated from one another along the separating layer if the outer pipe segment is heated and/or if the inner pipe segment is cooled. The heating or cooling of the corresponding pipe segment then leads to a gap forming between the at least two corresponding connecting elements as a result of the thermal longitudinal expansion or this results in an at least corresponding gap formation.

In this context, it may be particularly expedient if the cooled outer pipe segment and/or inner pipe segment is cooled to a temperature below 20° C., preferably below 15° C., in particular below 10° C. and/or if the heated outer pipe segment and/or inner pipe segment is heated to a temperature above 20° C., preferably above 30° C., in particular above 40° C.

The connection can be reinforced and made more durable if the outer pipe segment and/or inner pipe segment has at least one thrust rib in the region of the annular gap. In this case, it is particularly expedient and simple to realise if the at least one thrust rib is provided at least substantially circumferentially. In order to absorb high forces in the vertical direction and to be able to dissipate them in a uniform manner, it is further advisable if the at least one thrust rib is provided to be at least substantially annular.

Different materials can be used as casting compound. The casting compound can for example expediently have at least 25% by weight of tricalcium aluminate or $3CaO \cdot SiO2$ and/or dicalcium silicate (belite) or $2 CaO \cdot SiO2$. Regardless of this, it is particularly suitable if the casting compound has a cement content of at least 200 kg per cubic metre (kg/m$^3$) and/or alkali silica reactive aggregates, for example in the form of greywacke, flint, opal and/or dolomite and/or at least a content of 2% by weight of bentonite, for example in the form of montmorillonite. However, casting mortar and/or grout is particularly reliable and durable, as well as easy to apply. Grout is, for example, a high-strength grouted concrete, a high-strength casting mortar or a cement suspension, which is known in different compositions. A grouted concrete or casting mortar is characterised by the addition of aggregates, in particular fine grain aggregates such as gravel, granite, greywacke and/or flint. The cement suspension is typically based on water-coated Portland cement according to EN 197. Alternatively, special mortars are used. The cube compressive strength is generally more than 20 N per square millimetre, but usually more than 40 N per square millimetre (N/mm2). In this case, an expanding casting compound, a substance known as an expansive casting compound, in particular a grout which expands during hardening, a substance known as expansive grout, can be used as required to reinforce the force-fitting connection. Grouts that are manufactured with alkali silica reactive aggregates or additions of bentonite are particularly preferred. However, calcium sulphoaluminate cements or an aluminate can also be used.

In the case of a first particularly preferable embodiment of the connection, the separating layer is provided between the connecting elements for producing the connection. The separating layer therefore does not have to be removed before the connection is finally joined. This may, however, still be the case. The separating layer can be used as a sealing compound and/or for the uniform distribution of forces over the circumference of the connection. The use of at least one separating layer in the form of a film, preferably a plastic film, in particular a film made of polyvinyl chloride (PVC) and/or polytetrafluoroethylene (PTFE) is particularly simple and expedient. However, the separating layer can also be formed at least partially by a metal, for example in the form of aluminium, iron or steel, and/or a carbon fibre fabric and/or a glass fibre fabric and/or a fibre-reinforced composite material. In a further embodiment, the separating layer used to establish the connection can be replaced or supplemented by a separating layer which expands offshore under the influence of weathering before the connection is subsequently installed. In particular, separating layers made of bentonite, preferably bentonite mats, are considered here.

Alternatively or additionally, the connecting elements and/or the separating layer between the connecting elements in the annular gap can be designed at least in sections at least substantially cylindrically and/or at least substantially conically. This allows for an easy joining of the connection and at the same time for the provision of a connection that can absorb high forces.

In all other respects, the pipe segments can be designed to be cylindrical or conical at least in the region of the annular gap. Cylindrical pipe segments are thus simple and more cost-effective to provide, while conical pipe segments can transfer greater forces as required. Alternatively or additionally, the pipe segments can be pipe segments of an offshore structure, since the advantages of the connection then come into play in particular.

Corresponding offshore structures can be, for example, oil or gas platforms. Due to the corresponding cost pressure and time pressure, it is particularly expedient when installing corresponding towers if the pipe segments are designed as tower segments or foundation segments of a wind turbine, in particular of an offshore wind turbine.

BRIEF DESCRIPTION OF THE DRAWINGS

The invention is explained in greater detail below by means of a drawing merely depicting exemplary embodiments. In the drawings.

DESCRIPTION OF THE INVENTION

Figure 1:
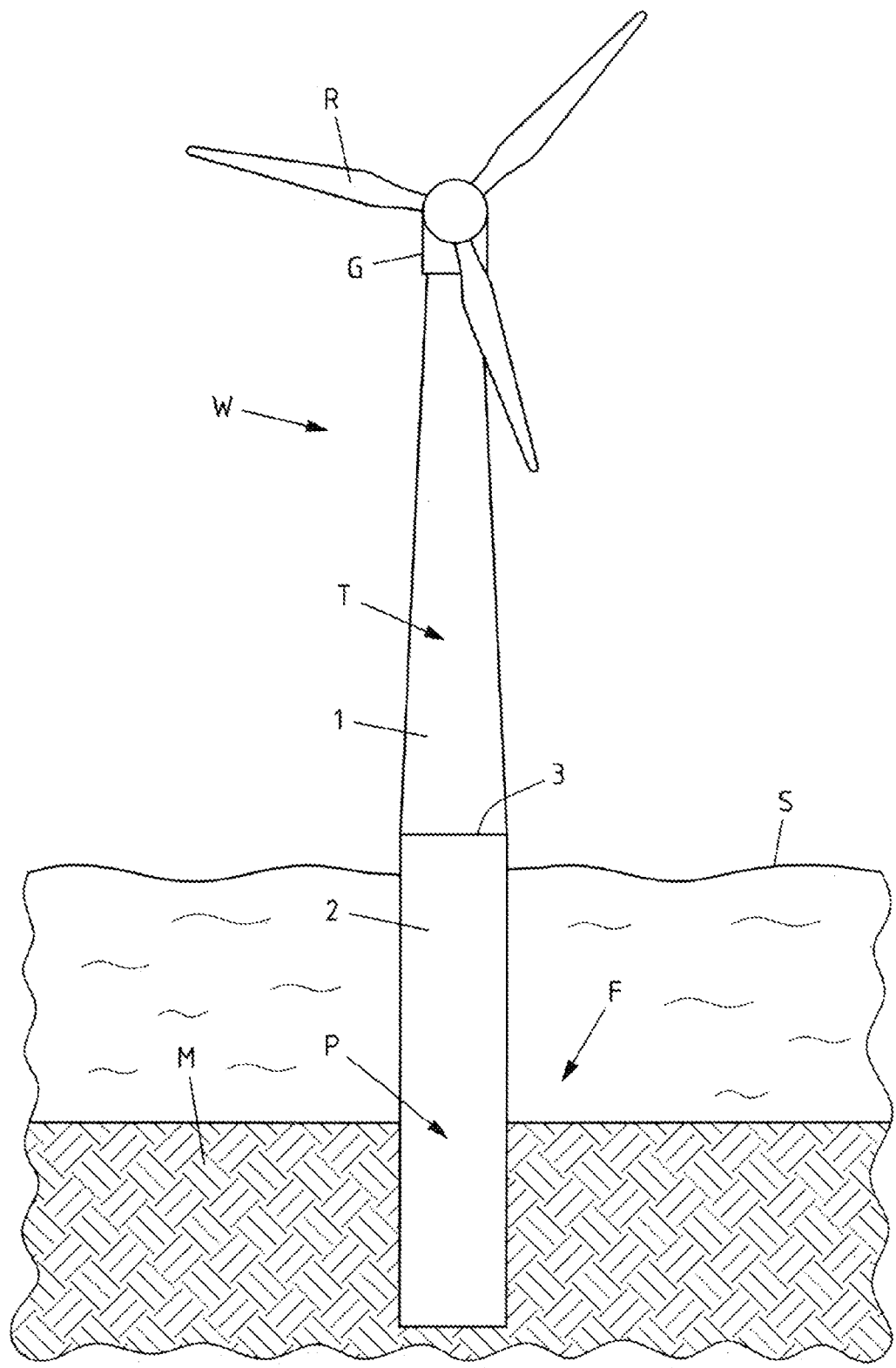
FIG. 1 shows a schematic side view of an offshore wind turbine.

FIG. 1 shows an offshore wind turbine W. The wind turbine W comprises a monopile foundation F formed by a foundation pile P in the form of a metal pipe embedded in the seabed M. The foundation pile P protrudes above sea level S and is connected there via a connection to tower T of wind turbine W, which carries nacelle G and rotor O of wind turbine W. In the present wind turbine W, the lower part of the tower T is designed as a cylindrical pipe segment 1 and the upper part of the foundation pile P is designed as a cylindrical pipe segment 2. Both pipe segments 1, 2 are designed as steel pipes. In addition, the diameter of the upper pipe segment 1 is larger than the diameter of the lower pipe segment 2, so that the upper pipe segment 1 can be pushed with its lower end onto the lower pipe segment 2 with its upper end.

Figure 2A:
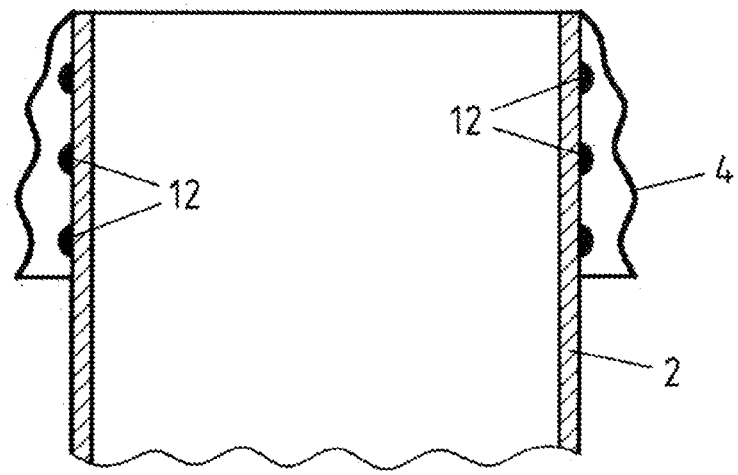
FIGS. 2A-F show schematic sectional views of method steps of a first method according to the invention for forming a first connection according to the invention and FIGS. 3A-F show schematic sectional views of method steps of a first method according to the invention for forming a first connection according to the invention.
Figure 2B:
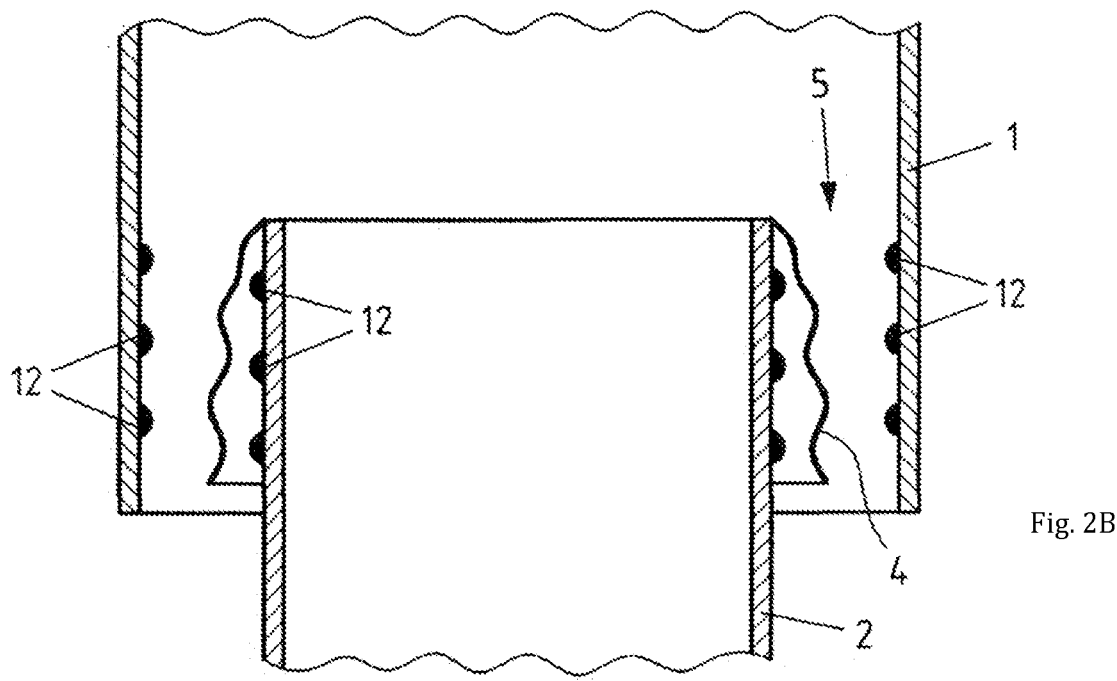
Figure 2C:
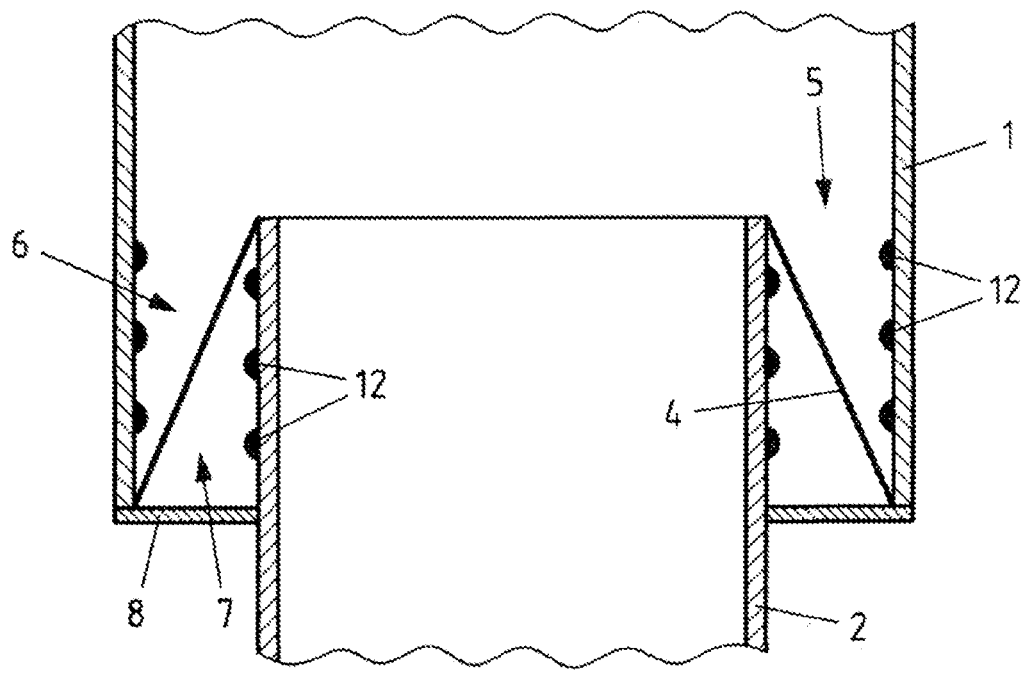
Figure 2D:
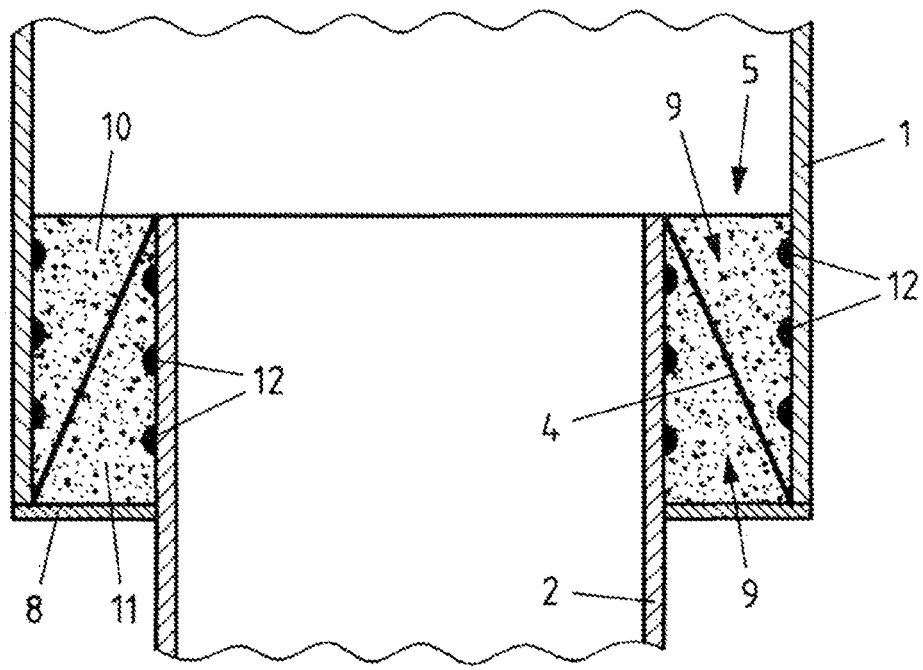
Figure 2E:
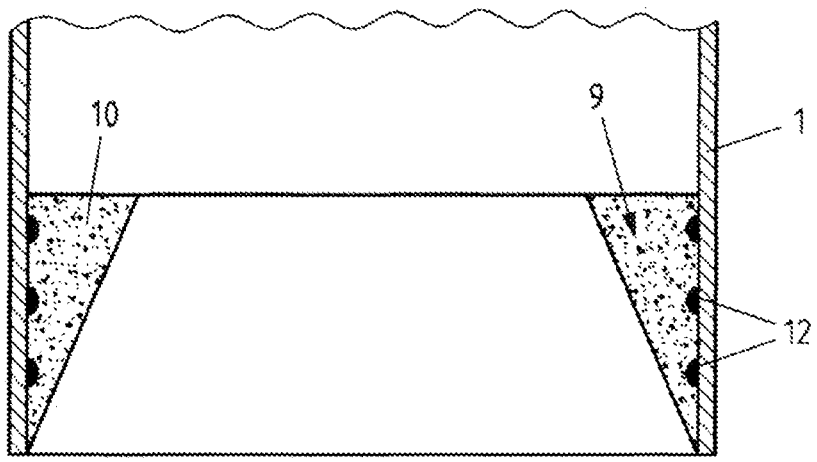
Figure 2E:
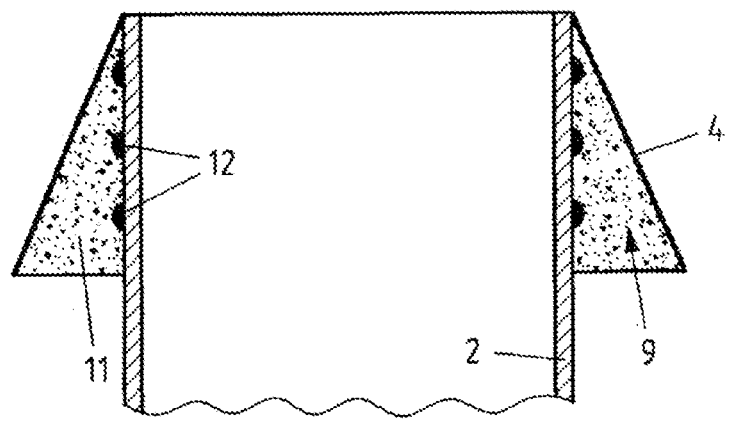

FIGS. 2A-F show step-by-step how the connection 3 is formed between the two pipe segments 1, 2. At the end of the narrower pipe segment 2, a separating layer 4 extending in the longitudinal direction L is initially applied in the form of a plastic film, as shown in FIG. 2A. Now, the ends of the two pipe segments 1, 2 assigned to one another are pushed together in sections in the longitudinal direction L of the pipe segments 1, 2, as shown in FIG. 2B. These are concentric pipe segments 1, 2 with a circular cross-section. In this way, an annular gap 5 is formed in the radial direction R. In the next step, the separating layer 4 is connected to the end of the other pipe segment 1 and namely in such a way that the separating layer 4 takes on a conical shape at least in sections, as shown in FIG. 2C. In this way, the separating layer 4 separates two regions 6, 7 of the annular gap 5 from one another. The region 6 open in a downwards direction is sealed by a ring 8 or a seal, such as what is known as a grout seal, and the two regions 6, 7 are cast at least partially adjacent to the separating layer 4 and to both sides of the separating layer 4 with a casting compound 9, which then hardens in the annular gap 5, wherein the casting compound 9 forms two separate connecting elements 10, 11 which are firmly connected to the respectively assigned pipe segment 1, 2, as shown in FIG. 2D. In order to strengthen this connection 3, in each case a plurality of thrust ribs 12 is provided on the outer side of the narrower, inner pipe segment 2 and on the inner side of the wider, outer pipe segment 1, which surround the inner side or the outer side of the respective pipe segment 1, 2 in a circular manner. However, the pipe segments 1, 2 and assigned connecting elements 10, 11 can be separated from one another again along the separating layer 4 by pulling the pipe segments 1, 2 back out of one another in the longitudinal direction L of the same, as shown in FIG. 2E.

Figure 2F:
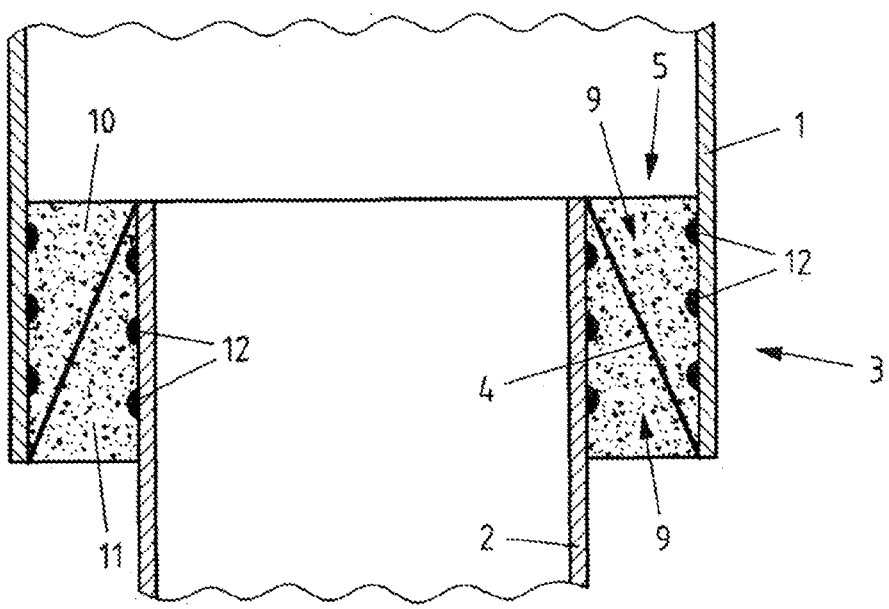

Now, the pipe segments 1, 2 can be moved separately to the installation location of the offshore wind turbine W and re-inserted there as before in order to join a connection 3 of the offshore wind turbine W, as shown in FIG. 2F. Since the same pipe segments 1, 2 are used for this as for forming the connecting elements 10, 11 from the casting compound 9 and the pipe segments 1, 2 are also turned against each other again as for forming the connecting elements 10, 11 from the casting compound 9, a defined and very precise connection 3 is obtained. The two pipe segments 1, 2 are held in a form-fitting manner in the longitudinal direction L of the pipe segments 1, 2 via the two connecting elements 10, 11. Twisting is prevented as a result of the dead weight of the upper pipe segment 1, 2 by a force-fitting connection of the connection 3.

The orientation of the pipe segments 1, 2 to be connected can also be reversed. If the narrower pipe segment 2 is to be the upper pipe segment and the wider pipe segment 1 the lower pipe segment, the connection 3 can be established in the same way. The arrangement of the pipe segments 1, 2 in the longitudinal direction L must only be reversed relative to one another when the connection 3 is finally joined. Alternatively or additionally, the orientation of the pipe segments 1, 2 to be connected can also be reversed before the insertion of the separating layer 4 and/or the at least one casting compound 9. It would therefore be possible to insert the narrower pipe segment 2 into the wider pipe segment 1 from above.

Figure 3A:
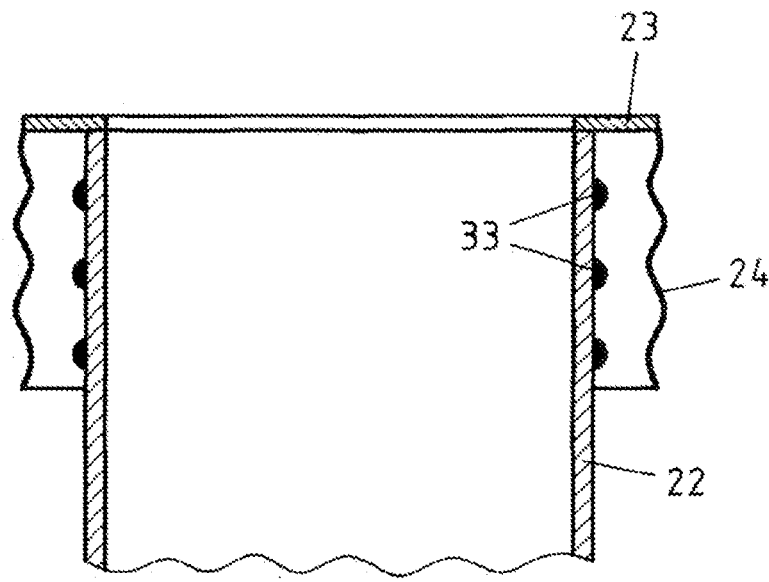
Figure 3B:
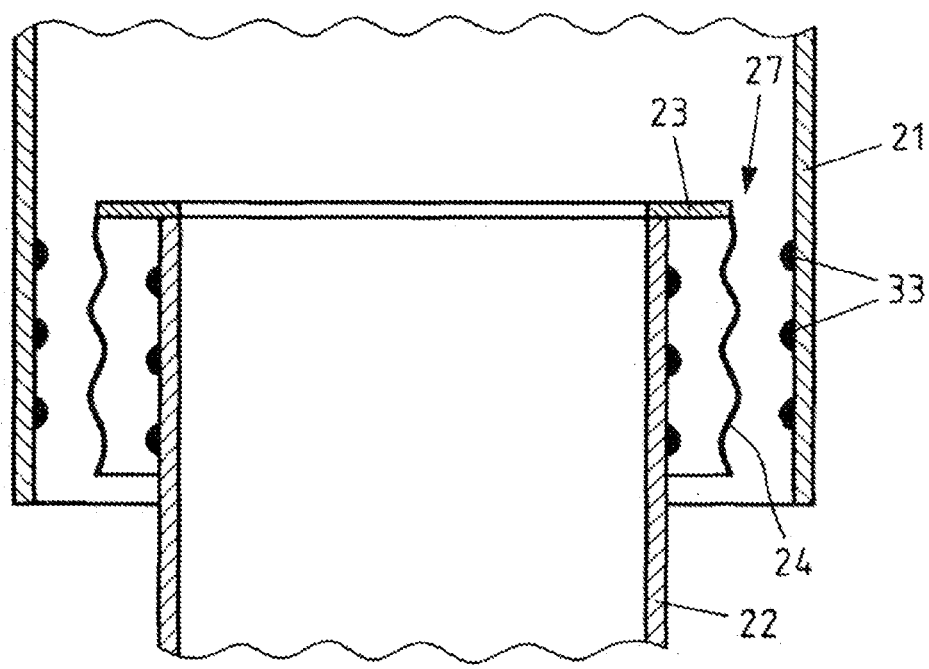

FIGS. 3A-F show step-by-step how an alternative connection 20 is formed between two pipe segments 21, 22 of different widths. At the end of the narrower pipe 22, a ring 23 is first detachably fastened, which circumferentially holds a separating layer 24 extending in the longitudinal direction L in the form of a plastic film, as shown in FIG. 3A. Further down, another ring 25 is held on the plastic film. Now, the ends of the two pipe segments 21, 22 assigned to one another are pushed together in sections in the longitudinal direction L of the pipe segments 21, 22, as shown in FIG. 3B. These are concentric pipe segments 21, 22 with a circular cross-section.

Figure 3C:
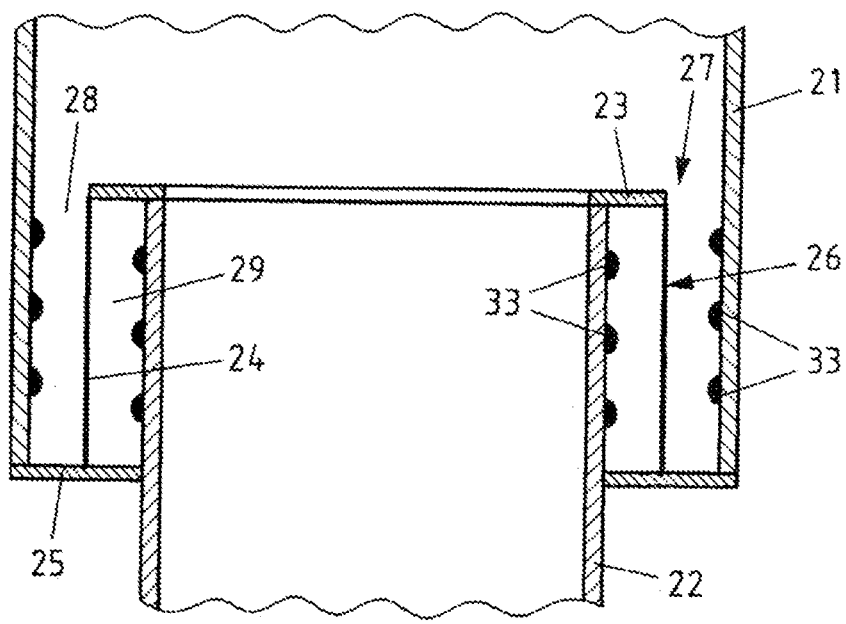
Figure 3D:
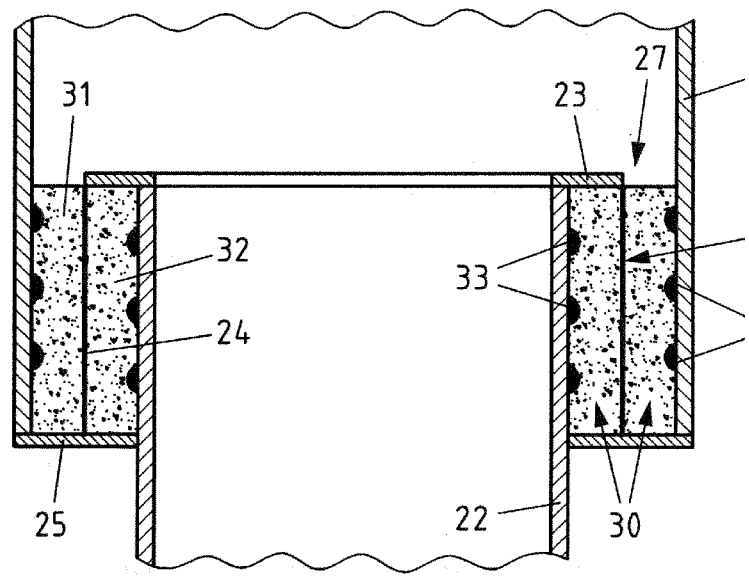
Figure 3E:
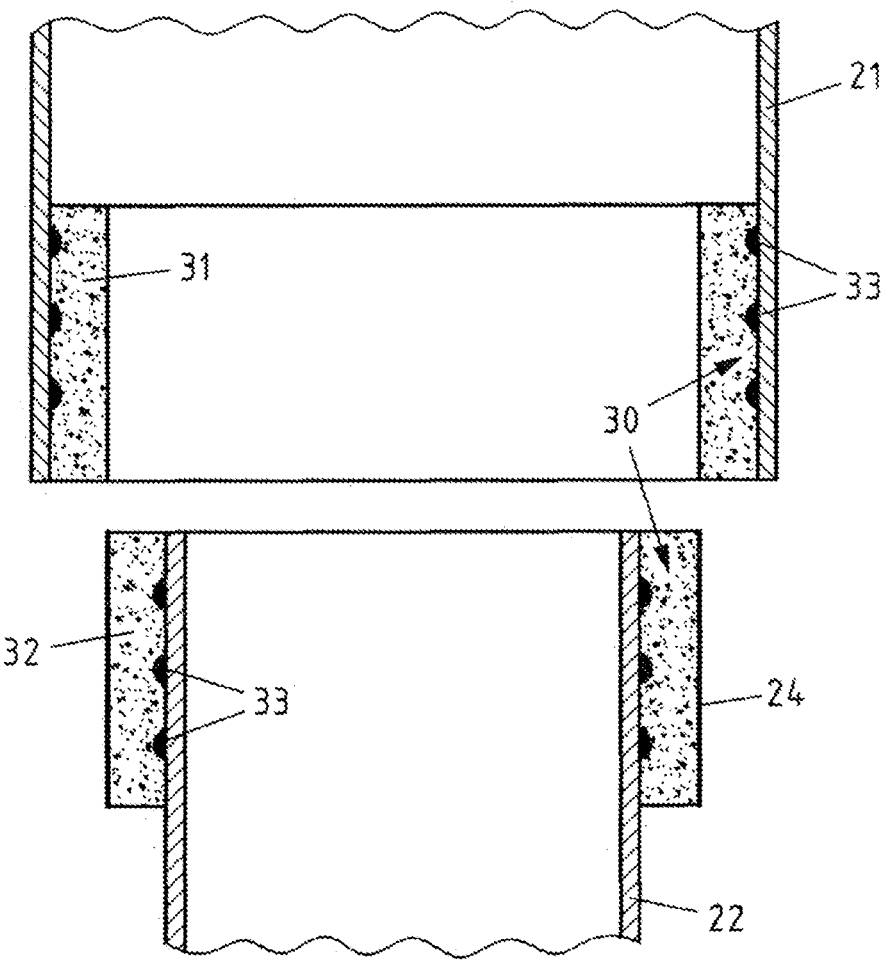

In this way, an annular gap is formed in the radial direction R, as shown in FIG. 3C. The separating layer 24 forms a cylindrical section 26 in the annular gap 27, wherein the two rings 23, 25 ensure that the separating layer 24 is spaced apart from both pipe segments 21, 22 in the cylindrical section 26. In addition, the rings 23, 25 close the annular gap 27 upwards and downwards so that the regions 28, 29 on both sides of the separating layer 24 are closed and can be filled with casting compound 30, which then hardens in the annular gap 27, wherein the casting compound 30 forms two separate connecting elements 31, 32, which are firmly connected to the respectively assigned pipe segment 21, 22, as shown in FIG. 3D. In order to strengthen this connection 20, in each case a plurality of thrust ribs 33 is provided on the outer side of the narrower, inner pipe segment 22 and on the inner side of the wider, outer pipe segment 21, which surround the inner side or the outer side of the respective pipe segment 21, 22 in a circular manner. However, the pipe segments 21, 22 and assigned connecting elements 31, 32 can be separated from one another again along the separating layer 24 by pulling the pipe segments 21, 22 back out of one another in the longitudinal direction L of the same, as shown in FIG. 3E.

Figure 3F:
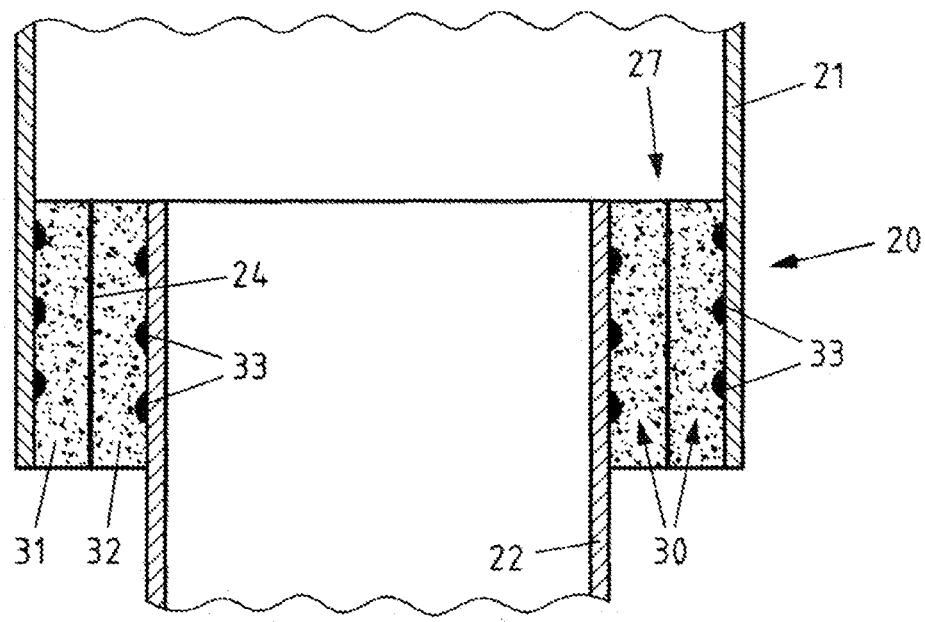

Now, the pipe segments 21, 22 can be moved separately to the installation location of the offshore wind turbine W and re-inserted there as before in order to join a connection 20 of the offshore wind turbine W, as shown in FIG. 3F. Since the same pipe segments 21, 22 are used for this as for forming the connecting elements 31, 32 from the casting compound 30 and the pipe segments 21, 22 are also turned against each other again as for forming the connecting elements 31, 32 from the casting compound 30, a defined and very precise connection 20 is obtained. In the longitudinal direction L, the pipe segments 21, 22 are held against one another in particular as a result of a force-fitting connection. This is caused by the expansive casting compound 30. The casting compound 30 expands for a certain time after the principle hardening. Consequently, the connecting elements 31, 32 expand after joining the connection 20. The corresponding connecting elements 31, 32 are increasingly pressed against each other as a result of the expansion in the joined state, which results in a strong force-fitting connection.

Whether the narrower pipe segment 2 is inserted from above into the wider pipe segment 1 or vice versa in the manufacture of the connection and/or in the subsequent installation of the pipe segments 1, 2 is fundamentally of secondary importance.

LIST OF REFERENCE NUMERALS 1.2 Pipe segment
3 Connection
4 Separating layer
5 Annular gap
6, 7 Regions
8 Ring
9 Casting compound
10, 11 Connecting element
12 Thrust ribs
20 Connection
21, 22 Pipe segments
23 Ring
24 Separating layer
25 Ring
26 Cylindrical section
27 Annular gap
28, 29 Region
30 Casting compound
31, 32 Connecting element
33 Thrust ribs
F Foundation
G Nacelle
L Longitudinal direction
M Seabed
O Rotor
P Foundation pile
R Radial direction
S Sea level
T Tower
W Wind turbine

The invention claimed is:

1. A method for forming a connection between two pipe segments of different widths,
in which a wider of the two pipe segments is pushed with one end partially over an end of a narrower of the two pipe segments;
in which the two pipe segments are positioned at a distance from one another, forming an annular gap between the two pipe segments;
in which a separating layer extending in the longitudinal direction of the two pipe segments or in the radial direction is provided in the annular gap between the two pipe segments;
in which the annular gap is cast at least partially with a casting compound adjacent to the separating layer and to a first side and an opposing second side of the separating layer;
in which, when the casting compound hardens, the casting compound on the first side of the separating layer forms a firm connection on the first side of the separating layer with one of the two pipe segments and the casting compound on the second side of the separating layer forms a firm connection on the second side of the separating layer with the other of the two pipe segments; and
in which after the hardening of the casting compound, the two pipe segments are separated along the separating layer thereby forming a connecting element on each of the first side and second side of the separating layer.

2. The method according to claim 1, in which, after separating the two pipe segments along the separating layer, the two separated pipe segments are reconnected in such a way that at least the separate connecting elements form a form-fitting connection or a force-fitting connection in the longitudinal direction of the two pipe segments.

3. The method according to claim 1,
in which steel pipe segments or reinforced concrete comprises the two pipe segments; or
in which cylindrical or conical pipe segments are used as the two pipe segments at least in the region of the annular gap; or
in which pipe segments of an offshore structure are used as the two pipe segments; or
in which tower segments of a wind turbine are used as the two pipe segments.

4. The method according to claim 1,
in which the two pipe segments are positioned concentrically to one another, forming the annular gap between the two pipe segments.

5. The method according to claim 1,
in which a film comprises the separating layer; or
in which the separating layer is formed at least partially by a metal; or
in which the separating layer is replaced or supplemented by an expanding separating layer before the connection is subsequently installed.

6. The method according to claim 1,
in which the separating layer is arranged cylindrically at least in sections in the annular gap; and
in which at least a cylindrical section of the separating layer extends at least substantially concentrically to the narrower pipe segment or to the wider pipe segment.

7. The method according to claim 1,
in which in the annular gap between the two pipe segments, the separating layer at least substantially closes the annular gap in the longitudinal direction of the pipe segments.

8. The method according to claim 1, in which the separating layer is formed at least in sections conically or obliquely to the longitudinal direction of the two pipe segments; and in which the separating layer is provided at least in the conical section on an inner edge of the annular gap in the longitudinal direction of the two pipe segments closer to the end of the narrower pipe segment forming the annular gap than to an outer edge of the annular gap or on the outer edge of the annular gap in the longitudinal direction of the two pipe segments closer to the end of the wider pipe segment forming the annular gap than to the inner edge of the annular gap.

9. The method according to claim 1,
in which the annular gap is at least partially cast with the casting compound concurrently with the wider pipe segment being heated or the narrower pipe segment being cooled or the narrower pipe segment being reinserted into the wider pipe segment after the casting compound has hardened; or
in which the hardened connecting elements are separated from one another along the separating layer concurrently with the wider pipe segment being heated or the narrower pipe segment being cooled.

10. The method according to claim 9, in which the wider pipe segment or the narrower pipe segment is cooled to a temperature below 20° C.; or
the wider pipe segment or narrower pipe segment is heated to a temperature above 20° C.

11. The method according to claim 1,
in which the wider pipe segment or the narrower pipe segment has at least one thrust rib in the region of the annular gap; and
in which the at least one thrust rib is at least substantially annular.

12. The method according to claim 1,
in which a grout or a casting mortar comprises the casting compound; or
in which an expansive grout
such as a grout with alkali silica reactive aggregates or additions of bentonite, comprises the casting compound; or
in which calcium sulphate aluminate cements or aluminate comprises the casting compound.

13. A connection of two pipe segments of different widths, with an annular gap between overlapping ends of a wider pipe segment and a narrower pipe segment formed using the method according to claim 1,
wherein a first of the connecting elements is firmly connected to an outer circumferential side of the inner pipe segment in the annular gap, a second of the connecting elements is firmly connected to an inner circumferential side of the outer pipe segment in the annular gap, at least one of the connecting elements comprises a hardened casting compound and the two connecting elements may be firmly connected in a form-fitting or force-fitting manner so that the pipe segments are connected in a longitudinal direction.

14. The connection according to claim 13, wherein the separating layer is positioned in the annular gap for producing the connection.

15. The connection according to claim 13,
wherein the connecting elements in the annular gap are at least substantially cylindrical or at least substantially conical at least in sections.

16. The connection according to claim 13,
wherein the pipe segments are cylindrical or conical or in that the pipe segments are pipe segments of an offshore structure or in that the pipe segments are tower segments of a wind turbine.

* * * * *